Nov. 2, 1971    R. F. McGILL    3,616,830
TIRE CHAIN FASTENING DEVICE
Filed Oct. 29, 1969    2 Sheets-Sheet 1

Roy F. McGill
INVENTOR.

BY Clarence A. O'Brien
and Harvey B. Jacobson
Attorneys

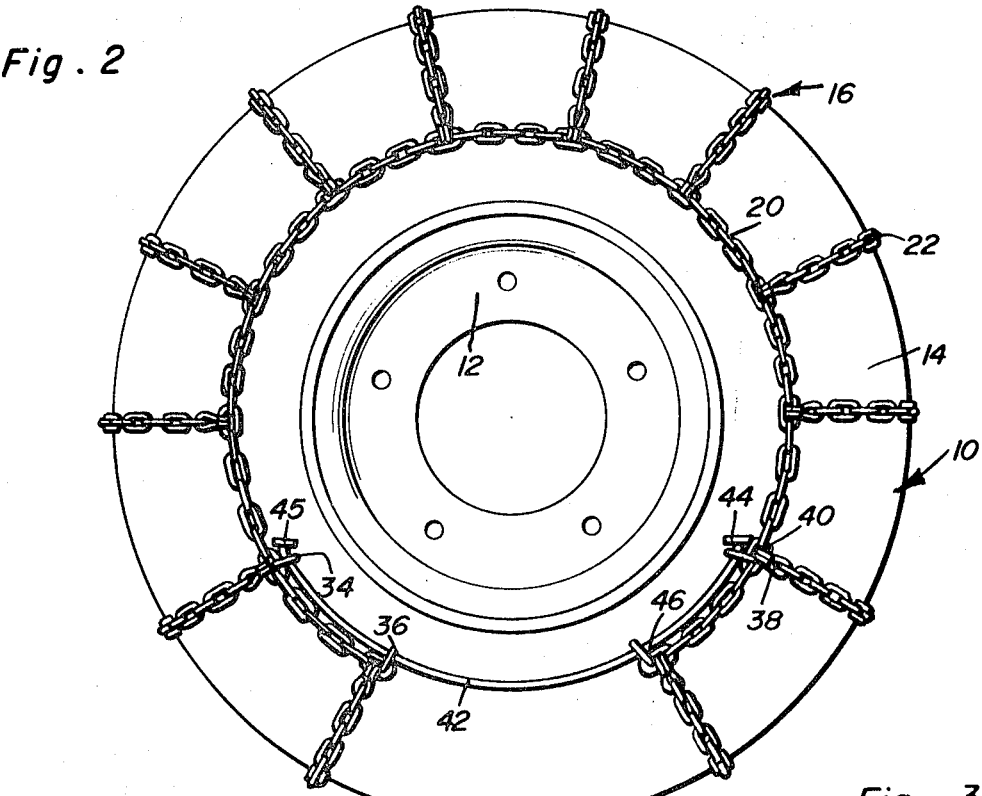
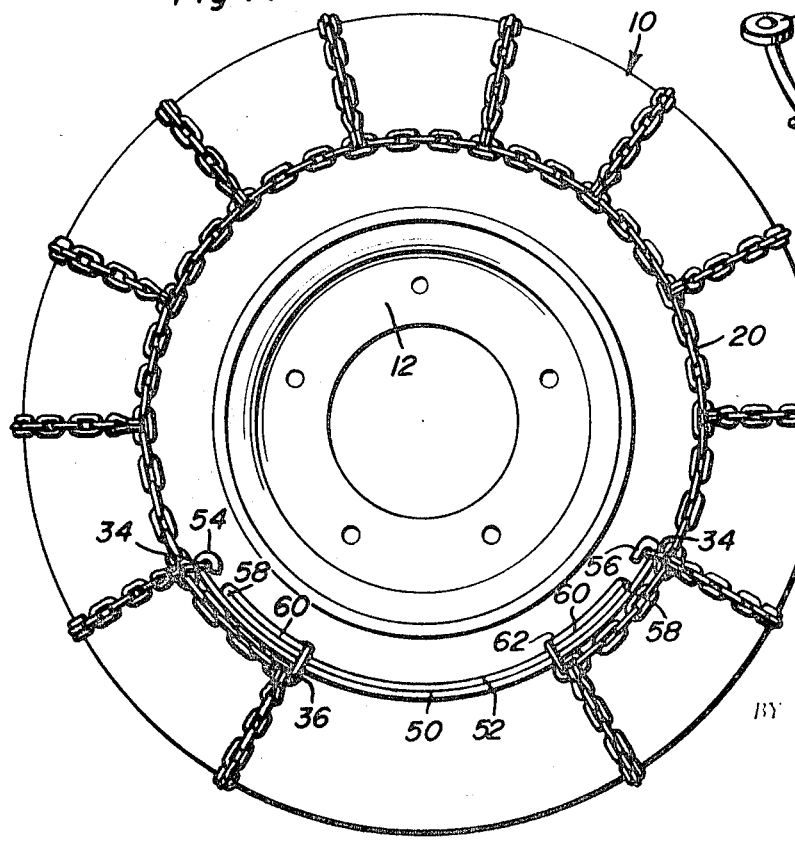
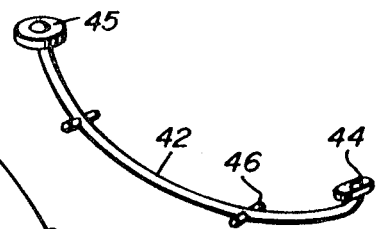
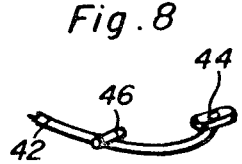

United States Patent Office 3,616,830
Patented Nov. 2, 1971

3,616,830
TIRE CHAIN FASTENING DEVICE
Roy F. McGill, 538 W. Poplar St.,
Gastonia, N.C. 28052
Filed Oct. 29, 1969, Ser. No. 872,110
Int. Cl. B60c 27/10
U.S. Cl. 152—213 A        3 Claims

ABSTRACT OF THE DISCLOSURE

A fastening device for securing tire chains on the drive wheels of an automotive vehicle employing an elongated arcuate connecting member associated with the ends of the circumferential side chain for the circumferential chain at the inner side of the tire and wheel assembly together with an adjustable turnbuckle structure interconnecting the ends of the circumferential chain at the outer surface of the tire and wheel assembly.

---

The present invention generally relates to tire chain structures and more particularly to a new and unique method of installing tire chains on motor vehicles without elevating the tires from the surface upon which the tires rest.

In present day tire chain structures, the side chains or circumferential chains have their ends interconnected by a detachable fastening device. In order to assemble the tire chains with the tire and wheel assembly, it is necessary to elevate the tire so that it is not in contact with a supporting surface which is usually accomplished by employing a jack or other lift device for lifting the vehicle.

An object of the present invention is to provide a fastening device for tire chains in which the outside circumference chain has the ends thereof fastened with an adjustable fastener such as a turnbuckle or the like while the inner circumference chain has the ends thereof interconnected by a curved rod assembly having means thereon for connection with the ends of the inside circumference chain with the curved rod having an arcuate length approximating one third of the circumference of the wheel at the circumferential portion thereof at which the inner circumference chain is disposed.

Another object of the invention is to provide a curved rod engaged with extra links of chain attached to the circumferential chain at the two end cross chains.

Still a further object of the invention is to provide a tire chain assembly which is simple in construction, easy to assemble and disassemble and relatively inexpensive to manufacture.

These together with other objects and advantages which will become subsequently apparent reside in the details of construction and operation as more fully hereinafter described and claimed, reference being had to the accompaying drawings forming a part hereof, wherein like numerals refer to like parts throughout, and in which:

FIG. 2 is a side elevational view of the tire chain illustrating the inside circumference chain and the arcuate rod connector associated therewith.

FIG. 3 is a perspective view of the arcuate rod connector employed in the inside circumfermence chain.

FIG. 7 is a side elevational view of the inside circumference chain illustrating another arcuate rod connector.

FIG. 8 is a fragmental view illustrating a variation in the structure of the arcuate rod.

Figure 1:
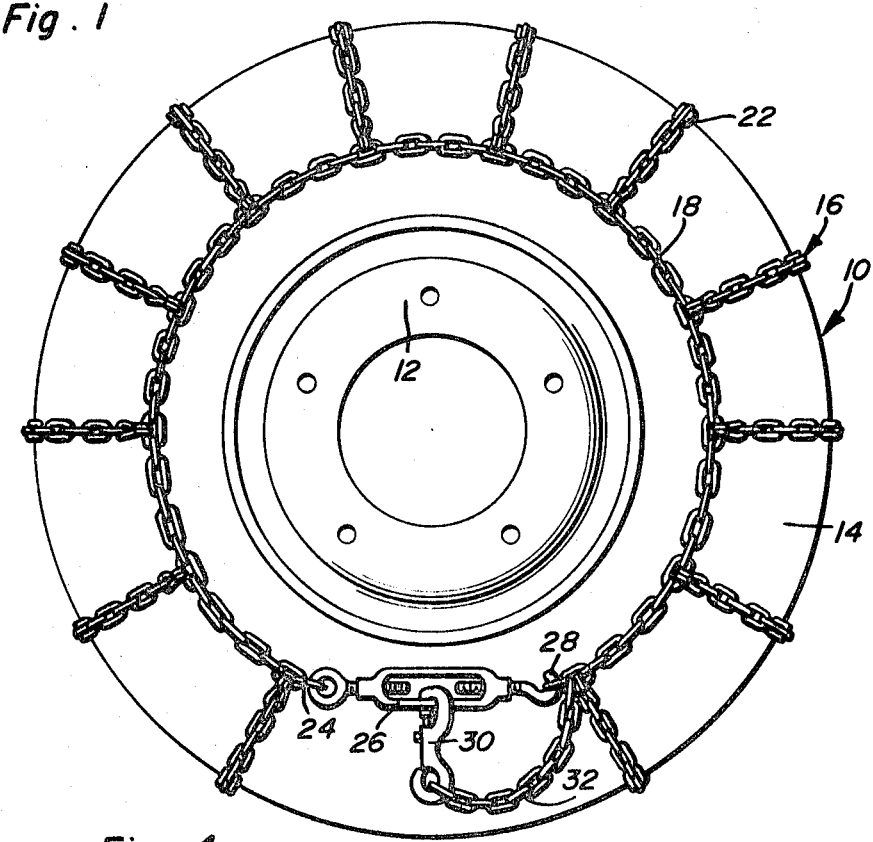
FIG. 1 is a side elevational view of the tire chain illustrating the outside circumference chain and the fastener assembly associated therewith.

Referring now specifically to the drawings, a tire and wheel assembly generally designated by the numeral 10 includes a mounting wheel 12 and an inflated pneumatic tire 14 mounted thereon in a conventional manner. Mounted o nthe assembly 10 is a tire chain structure generally designated by the numeral 16 and including an outer circumference chain 18 and an inner circumference chain 20 lying alongside of the tire in a conventional manner with the circumference chains 18 and 20 being interconnected by cross chains 22 which extend across the tread face of the tire 14 for aiding in traction for a vehicle in a well known manner.

As illustrated in FIG. 1, the ends of the outer circumference chain 18 are defined by end links 24 which extend circumferentially beyond the last cross chains 22. A turnbuckle 26 has an eye or loop on one end secured permanently to one of the links 24 and a hook 28 detachably connected to the other of the ends links 24 to adjustably interconnect the end links 24 on the outer circumference chain 18. Thus, by rotating the central portion of the turn buckle in a conventional manner, the turnbuckle 26 may be engaged with or detached from the outer circumference chain and the circumference of the outer circumference chain 18 may be varied for securing the tire chain assembly 16 in position on the tire and wheel assembly 10.

A snap hook 30 is attached to the central rotatable portion of the turnbuckle 26 and is tethered to the tire chain by a tether chain 32 which serves to retain the turnbuckle in adjusted position after it has been adjusted in a desired manner.

Figure 4:
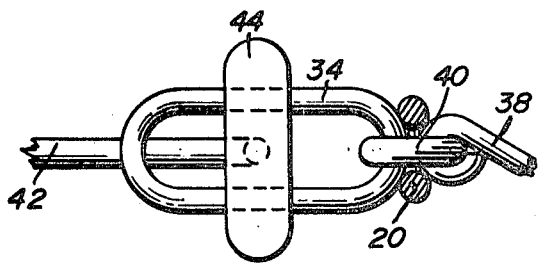
FIG. 4 is a detailed view of the end of the arcuate rod and the associated link on the inner circumference chain.
Figure 5:
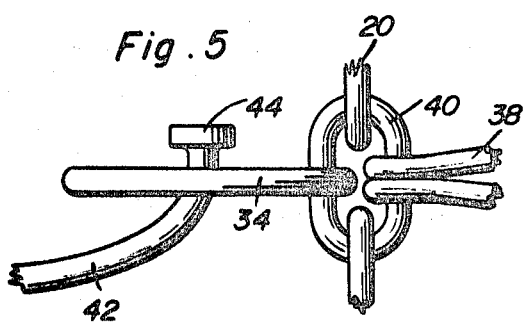
FIG. 5 is a side elevational view of the construction of FIG. 4.

The inner circumference chain 20 has extra links 34 and 36 attached to each end thereof in alignment with the two end cross chains 22 with the links 34 and 36 being connected with the circumference chain links to which the end links of the cross chain is connected with this construction best being illustrated in FIGS. 4 and 5 in which the end link of the cross chain is designated by the numeral 38 and the link of the circumference chain 20 to which the link 34 and the end link 38 is connected being designated by numeral 40.

Figure 6:
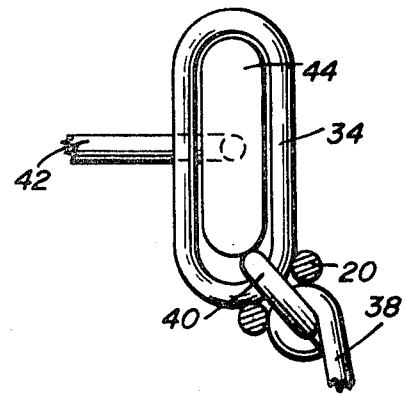
FIG. 6 is a view similar to FIG. 4 but illustrating the manner in which the link is removed from the end of the arcuate rod.

Extending between the adjacent ends of the circumference chain 20 is an elongated arcuate rod or stamped member 42 which generally conforms with the curvature of the circumference chain 20 with one end of the arcuate rod 42 having generally an oval-shaped retaining member 44 thereon which has a peripheral dimension that will pass through the oval-shaped link 34 when the longitudinal axis of the retaining plate 44 is aligned with the longitudinal axis of the link 34 as illustrated in FIG. 6 while the plate 44 will be retained in assembled relation to the link 34 when the plate 44 is oriented with the longitudinal axis thereof perpendicular to the longitudinal axis of the link 34 as illustrated in FIGS. 4 and 5. The other end of rod 42 has a round plate 45 permanently attached thereto for permanent connection with link 34. The links 36 can also be passed over the plate 44 and transverse pins 46 provided on the arcuate rod 42 in spaced relation to the plate 44 for passing through the links 36 and serving to retain the ends of the inner circumference chain 20 in position.

The pins 46 may be in the form of through pins as illustrated in FIG. 3 or they may be in the form of welded pins 46' as illustrated in FIG. 8 which simplifies the construction inasmuch as the pins 46' may be merely welded to the surface of the arcuate rod 42.

FIG. 7 illustrates another embodiment of the fastening device for the inner circumference chain 20 which is in the form of a pair of overlapping arcuate rods 50 and 52. One end of the arcuate rod 50 is provided with a loop or eye 54 thereon engaged with the link 34 on the inner circumference chain and the other end of the arcuate rod 50 is provided with a hook 56 engaging the link 34 at the opposite end of the inner circumference chain 20. The arcuate rod 50 also extends through the extra links 36 at the free ends of the inner circumference chain 20 as illustrated in FIG. 7. Each end of the arcuate rod 52 extends through the extra links 36 and extends along the inner surface of the rod 50 with each end thereof terminating in a reversely curved or bent terminal end portion 58 that is disposed adjacent to but spaced longitudinally inwardly from the loop end 54 and hook 56 respectively of the outer arcuate rod 50. Extending longitudinally and arcuately from the reversely curved ends is an end portion 60 which overlaps a portion of the arcuate rod 52 and extends along the inner surface thereof to slightly outwardly flared ends 62 which are engaged with the link 60 and which may be slightly compressed when inserted through the links 36 after which the outwardly flared end 62 will engage with the link to retain the link 36 in spaced relation to the link 34.

In constructing the tire chain assembly, one cross chain that is normally provided is removed and two extra links 34 and 36 are attached to the inner circumference chain at the links 40 to which the end cross chains and the adjacent to the end cross chains are attached. The curved rod 42 or the rods 50 and 52 are inserted through the extra links which are retained in predetermined relation thereto and the curved rod or rods have means thereon retaining the loose end of the circumference chain associated therewith with the curved rod or rods having a length of approximately one-third of the circumference of the tire 14 at the point at which the circumference chains are oriented in relation to the tire. With this construction, the portion of the tire that may be resting on a supporting surface is not disturbed inasmuch as the chain may be assembled with the tire and the arcuate rod manipulated to interconnect the ends of the inner circumference chain and thereafter, the turnbuckle or equivalent fastening device employed for interconnecting the associated ends of the outer circumference chain 18. If adjustment is needed for the turnbuckle beyond the scope of extension and retraction thereof, the hook 28 may be engaged with one of the links of the chain 32 to adjust the effective circumference of the chain 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A tire chain assembly for increasing the traction of a vehicle wheel comprising an outer circumference chain, an inner circumference chain, a plurality of longitudinally spaced cross chains interconnecting the circumference chains, means adjustably interconneting the ends of the outer circumference chain and means releasably interconnecting the ends of the inner circumference chain, the ends of the inner and outer circumference chains being spaced apart and having the endmost cross chains attached thereto, said means interconnecting the ends of the inner circumference chain including an elongated arcuate rod having a radius generally equal to the radius of the inner circumference chain and defining a continuous bridge across the space between the ends of the inner circumference chain and the endmost cross chains attached thereto, and means detachably connecting the arcuate rod to each end portion of the inner circumference chain at longitudinally spaced points, wherein said arcuate rod includes a circular end plate and an oval-shaped end plate rigid therewith, and crosspins rigid with the rod in spaced relation to the end plates, said means connecting the arcuate rod to the circumference chain including a pair of oval-shaped links attached to each end of the inner circumference chain in longitudinally spaced relation with the links preventing passage of the circular end plate while permitting passage of the oval-shaped end plate and transverse pin in one position thereof and normally oriented in a different position to retain the links attached to the rod inwardly of the pin and end plate thereon respectively.

2. The structure as defined in claim 1 wherein the links on the inner circumference chain are attached to the circumference chain at the same links as the cross chains at the end and adjacent to the end of the circumference chain.

3. A tire chain assembly for increasing the traction of a vehicle wheel comprising an outer circumference chain, an inner circumference chain, a plurality of longitudinally spaced cross chains interconnecting the circumference chains, means adjustably interconnecting the ends of the outer circumference chain and means releasably interconnecting the ends of the inner circumference chain, the ends of the inner and outer circumference chains being spaced apart and having the endmost cross chains attached thereto, said means interconnecting the ends of the inner circumference chain including an elongated arcuate rod having a radius generally equal to the radius of the inner circumference chain and defining a continuous bridge across the space between the ends of the inner circumference chain and the endmost cross chains attached thereto, and means detachably connecting the arcuate rod to each end portion of the inner circumference chain at longitudinally spaced points, wherein said elongated arcuate rod includes a pair of arcuate rods extending adjacent each other with one rod being radially inwardly of the other, the outermost rod having inturned ends, the innermost rod having inwardly facing abutments disposed inwardly of the ends of the outer rod, said means on the inner circumference chain engaging the rod including a pair of longitudinally spaced links attached to the circumference chain with the ends of the outer rod engaging the remote links and the abutments on the inner rod engaging the adjacent links for retaining the inner circumference chain assembled with the tire and wheel assembly.

References Cited
UNITED STATES PATENTS

| | | | |
|---|---|---|---|
| 1,906,034 | 4/1933 | Woolley | 152—213 |
| 3,228,446 | 1/1966 | Meys | 152—241 |

JAMES B. MARBERT, Primary Examiner